(12) United States Patent
Kawamura et al.

(10) Patent No.: US 8,663,594 B2
(45) Date of Patent: Mar. 4, 2014

(54) EXHAUST GAS TREATING METHOD

(75) Inventors: Kazushige Kawamura, Yokohama (JP);
Dai Takeda, Yokohama (JP); Eiji Awai,
Yokohama (JP); Akira Kumagai,
Yokohama (JP)

(73) Assignee: Chiyoda Corporation, Yokohama-shi, Kanagawa (JP)

( * ) Notice: Subject to any disclaimer, the term of this patent is extended or adjusted under 35 U.S.C. 154(b) by 0 days.

(21) Appl. No.: 12/530,386

(22) PCT Filed: Mar. 5, 2008

(86) PCT No.: PCT/JP2008/054430
§ 371 (c)(1),
(2), (4) Date: Oct. 22, 2009

(87) PCT Pub. No.: WO2008/108496
PCT Pub. Date: Sep. 12, 2008

(65) Prior Publication Data
US 2010/0061909 A1    Mar. 11, 2010

(30) Foreign Application Priority Data

Mar. 7, 2007    (JP) ................................. 2007-056597
Nov. 22, 2007    (JP) ................................. 2007-303323

(51) Int. Cl.
*C01B 15/06* (2006.01)
*C01B 7/00* (2006.01)
*B01D 47/00* (2006.01)
*B01D 53/14* (2006.01)

(52) U.S. Cl.
USPC ............ 423/513; 423/210; 423/222; 423/506

(58) Field of Classification Search
None
See application file for complete search history.

(56) References Cited

U.S. PATENT DOCUMENTS

| | | | |
|---|---|---|---|
| 3,725,530 A | 4/1973 | Kawase et al. | |
| 4,009,241 A * | 2/1977 | Kawase et al. | 423/210 |
| 4,233,274 A | 11/1980 | Allgulin | |
| 6,197,269 B1 * | 3/2001 | Jansen et al. | 423/243.01 |
| 6,942,840 B1 | 9/2005 | Broderick | |
| 2003/0161771 A1 | 8/2003 | Oehr | |
| 2004/0013589 A1 | 1/2004 | Vosteen et al. | |
| 2004/0086439 A1 * | 5/2004 | Vosteen et al. | 423/210 |
| 2005/0147549 A1 | 7/2005 | Lissianski et al. | |
| 2007/0212296 A1 * | 9/2007 | Digdon | 423/659 |

FOREIGN PATENT DOCUMENTS

| | | |
|---|---|---|
| CN | 1895745 A | 1/2007 |
| DE | 4241726 C1 | 3/1994 |
| JP | 61257223 | * 11/1986 |
| JP | 5-329327 A | 12/1993 |
| JP | 10-216476 A | 8/1998 |
| JP | 2004-66229 A | 3/2004 |
| JP | 2004-313893 A | 11/2004 |
| JP | 2006-263700 A | 10/2006 |
| JP | 2007-530256 A | 11/2007 |

OTHER PUBLICATIONS

International Search Report of PCT/JP2008/054430, date of mailing Apr. 15, 2008.
Notification of Transmittal of Copies of Translation of the International Preliminary Report on Patentability (Form PCT/IB/338) of International Application No. PCT/JP2008/054430 mailed Oct. 8, 2009 with forms PCT/IB/373, PCT/IB/326 and PCT/ISA/237.
European Search Report dated Feb. 16, 2011, issued in corresponding European Patent Application No. 08721846.7.
European Search Report dated Apr. 17, 2012, issued in corresponding European Patent Application No. 12153676.7; (7 pages).
Japanese Office Action dated Jun. 4, 2013, issued in corresponding Japanese Patent Application No. 2007-303323, w/ English translation.
Ueno, S. et al., "Development of Mercury Control Technology in Wet-type Flue Gas Desulfurization Unit", The Japan Institute of Energy, vol. 43, Oct. 12, 2006, pp. 41-42; cited in Japanese Office Action dated Jun. 4, 2013.
Chinese Office Action dated Aug. 3, 2011, issued in corresponding Chinese Patent Application No. 200880012959.

* cited by examiner

*Primary Examiner* — Patricia L Hailey
*Assistant Examiner* — Sheng H Davis
(74) *Attorney, Agent, or Firm* — Westerman, Hattori, Daniels & Adrian, LLP

(57) ABSTRACT

An exhaust gas treating method removes sulfur dioxide from exhaust gas containing at least sulfur dioxide and mercury by bringing the exhaust gas into contact with absorption liquid. Persulfate is added into the absorption liquid or alternatively, iodine gas is added to the exhaust gas before the exhaust gas is brought into contact with the absorption liquid. A high removal rate for both sulfur dioxide and mercury is stably maintained if the load of power generation and the composition of exhaust gas fluctuate.

6 Claims, 5 Drawing Sheets

EXHAUST GAS TREATING METHOD

TECHNICAL FIELD

The present invention relates to an exhaust gas treating method. More particularly, the present invention relates to a method of removing sulfur dioxide and mercury from exhaust gas containing them.

BACKGROUND ART

Combustion exhaust gas (to be referred to as "exhaust gas" hereinafter) discharged from boilers in thermoelectric power stations and waste incinerators generally contains sulfur dioxide ($SO_2$). Sometimes, it also contains mercury to a high-concentration level depending on the type of fossil fuel (coal in particular) and the types of wastes that are burnt there. Since those substances are harmful substances that adversely affect the health of inhabitants if discharged into the environment, they need to be removed before exhaust gas is emitted into the atmosphere from those facilities. Of the above listed substances, sulfur dioxide has been and being required to be removed by exhaust gas release control regulations. Recently, regulations for compulsorily removing mercury from exhaust gas have been enforced in some countries.

Methods of removing sulfur dioxide ($SO_2$) from exhaust gas include wet methods of causing absorption liquid to absorb and remove sulfur dioxide and dry methods of causing an adsorbent to adsorb and remove sulfur dioxide. While a number of methods are known for both wet methods and dry methods, wet methods are generally employed to process a large quantity of exhaust gas containing sulfur dioxide to a high-concentration level from the viewpoint of treating cost.

Mercury in exhaust gas contains both $Hg^{2+}$, or divalent mercury compounds, produced as mercury is oxidized by combustion in incinerators and catalysts of flue gas denitrators (SCR) and $Hg^{(0)}$, or elemental (zero-valent) metal mercury, of which $Hg^{2+}$ is removed almost entirely in the wet scrubber of a flue gas desulfurization unit but $Hg^{(0)}$ is poorly removed to represent a low removal efficiency because it is hardly dissolved in absorption liquid. In other words, most of $Hg^{(0)}$ in exhaust gas is currently not removed and emitted into the atmosphere.

A method of removing $Hg^{(0)}$ by adding active carbon powder into exhaust gas and causing the latter to be adsorbed by the former is known (Japanese Patent Application Laid-Open No. 09-308817). However, a large facility including equipment for ejecting active carbon powder that is solid into exhaust gas, a large electric dust collector (or electric precipitator, EP) for capturing at a downstream side active carbon dispersed in exhaust gas along with fly ash and a device for processing the captured active carbon that is mixed with fly ash is required to carry out this method to make the entire exhaust gas treating facility complex and costly. While the mercury removing ability may expectedly be enhanced when halogen such as iodine or bromine is made to adhere to active carbon, sulfuric acid produced from sulfur dioxide is apt to be accumulated on active carbon when halogen is made to adhere to active carbon so that the reality is that the mercury adsorbing ability is not raised to such an expected level.

A method of raising the extent of oxidizing $Hg^{(0)}$ in exhaust gas to $Hg^{2+}$, by adding one or more halogen compounds such as hydrogen chloride (HCl) and/or calcium bromide ($CaBr_2$) to the coal that is burnt as fuel or by utilizing the oxidation catalyst in a denitrator has also been proposed (Japanese Patent Application Laid-Open No. 2004-66229). However, this method has a drawback of shortening the service life of the catalyst and it is difficult to achieve a high oxidation rate because of the diffusion limited access of $Hg^{(0)}$. Thus, it is difficult to oxidize $Hg^{(0)}$ to $Hg^{2+}$ stably at high efficiency for a long period of time, accommodating fluctuations in the coal types and the combustion conditions.

Meanwhile, a method of adding a mercury fixing agent such as a chelating agent or a potassium iodide (KI) solution or an oxidizing agent such as hypochlorous acid (HClO) or hydrogen peroxide ($H_2O_2$) to the absorption liquid in a wet type flue gas desulfurization unit is known (Japanese Patent Application Laid-Open No. 10-216476). However, this method is accompanied by a problem that the mercury solidifying agent or the oxidizing agent is consumed and decomposed in a reaction with some other metal and in oxidation of $SO_2$ in exhaust gas and also volatilized and discharged from the flue to consequently increase the consumption of such additives. Additionally, chelating agents give rise to a problem of being decomposed to produce hydrogen sulfide ($H_2S$) and give off a foul smell.

Additionally, as for the method of adding various additives to absorption liquid, it is known that the state of the absorption liquid changes as the load of power generation and the composition of exhaust gas fluctuate so that consequently some of the $Hg^{(0)}$ that is absorbed is emitted or $Hg^{2+}$ is reduced to become $Hg^{(0)}$, which is then emitted again. Techniques of not releasing $Hg^{(0)}$ again are being developed in view of this problem (Japanese Patent Application Laid-Open No. 2004-313833). Furthermore, with techniques of using an oxidizing agent such as hypochlorous acid, hydrogen peroxide, chromic acid ($H_2CrO_4$) or chlorine ($Cl_2$), the oxidizing agent inevitably reacts with $SO_2$ in exhaust gas to be consequently consumed to a large extent. Therefore, a technique of spraying such an oxidizing agent at the gas downstream side of the flue gas desulfurizer has been proposed (Japanese Patent Application Laid-Open No. 2001-162135).

DISCLOSURE OF THE INVENTION

As pointed out above, the known techniques of removing mercury in exhaust gas with sulfur dioxide are accompanied by problems including that a high removal rate cannot be stably maintained for a long period of time in addition to a problem that the oxidizing agent for oxidizing mercury is consumed to oxidize sulfur dioxide so as to be lost to a large extent, that the additives such as a fixing agent are not exploited effectively and that $Hg^{(0)}$ is emitted again from the absorption liquid due to insufficient oxidation of mercury. Therefore, the object of the present invention is to provide an exhaust gas treating method that can comprehensively dissolve these problems and stably maintain a high removal rate for sulfur dioxide and mercury stably for a long period of time if the load of power generation and the composition of exhaust gas fluctuate.

(1) First Mode

In the first mode of the present invention, there is provided an exhaust gas treating method of bringing exhaust gas containing at least sulfur dioxide and mercury into contact with absorption liquid, characterized by adding persulfate into the absorption liquid in order to solve the above problems.

The persulfate (i.e. peroxodisulfate $S_2O_8^{2-}$) that is added in the first mode of carrying out the present invention practically does not react with $SO_2$ but selectively reacts with $Hg^{(0)}$ and oxidize it into $Hg^{2+}$. Therefore, unlike other oxidizing agents, it is not consumed to oxidize $SO_2$ and hence it is not required to be added excessively, compared with other oxidizing agents. From the viewpoint of convenience of handling, persulfate is added in the form of aqueous solution of a persulfate salt such as aqueous solution of sodium persulfate ($Na_2S_2O_8$). Persulfate is preferably added so as to make the concentration of persulfate in the absorption liquid 500 to 5,000 mg/L (as $S_2O_8^{2-}$).

Preferably, iodine, bromine or a compound of either of them is added to the absorption liquid. Conventionally, potassium iodide (KI) or potassium bromide (KBr) is added to absorption liquid to accelerate oxidation of $Hg^{(0)}$ (see, for example, Japanese Patent Application Laid-Open No. 10-216476). However, such a technique is accompanied by the above identified problems and the inventors of the present invention have found that the $Hg^{(0)}$ removal rate is not improved significantly simply by adding KI or KBr to absorption liquid. The inventors of the present invention looked into the cause of such a phenomenon to find that the oxidation-reduction potential (ORP) of absorption liquid falls as the concentration of KI or KBr added to the absorption liquid rises and is not restored satisfactorily even if the absorption liquid is subjected to aeration treatment. In other words, the inventors believe that the rate at which $I_2$ or $Br_2$, which is effective for removing $Hg^{(0)}$, is produced is not increased even if KI or KBr, whichever appropriate, is added at a high rate, so that the $Hg^{(0)}$ removal rate is not improved. Furthermore, when KI or KBr is added at a high rate, the discharged gas contains iodine or bromine, whichever appropriate, to a large extent to give rise to a problem of secondary pollution.

Meanwhile, it has been found that the ORP does not fall even if the concentration of added KI or KBr is increased when KI or KBr coexists with persulfate and, if $I_2$ or $Br_2$ that is produced from KI or KBr, whichever appropriate, is reduced once through the reaction of $I_2$ or $Br_2$ with $SO_2$, $I_2$ or $Br_2$, whichever appropriate, is reproduced as a result of reaction of the reduction product with persulfate. The inventors believe that reproduction of $I_2$ or $Br_2$ is realized only by dissolved oxygen in an environment where no persulfate exists and dissolved oxygen is consumed to remove $SO_2$ so that it cannot satisfactorily contribute to reproduction of $I_2$ or $Br_2$. On the other hand, the inventors also believe that persulfate does not react with $SO_2$ and takes a role of stably holding absorption liquid in an oxidizing atmosphere that represents a high ORP, while suppressing iodine or bromine from being emitted. Therefore, since the ORP is held high even if the $SO_2$ concentration and the $O_2$ concentration in exhaust gas fluctuate and/or the load of the boiler fluctuates, reemission of $Hg^{(0)}$ is effectively prevented from taking place. Persulfate is effective not only for removing mercury but also for stably removing sulfur dioxide.

Preferably, iodine, bromine or a compound of either of them is added to such an extent that its concentration in the absorption liquid is 0.5 to 8.0 milli-mol/L (mmol/L) in terms of iodine or bromine atoms.

It may be so arranged that, after bringing exhaust gas into contact with the absorption liquid, the mercury concentration of the exhaust gas is continuously observed and an operation of adding persulfate and also that of adding iodine, bromine or a compound of either of them are started when the mercury concentration rises to or above a predetermined level but the operation of adding iodine, bromine or a compound of either of them is stopped or the concentration thereof is reduced when the mercury concentration falls to or below the predetermined level. With such an arrangement, the consumption of the additive that may be iodine or bromine can be reduced and the possibility for exhaust gas of containing iodine or bromine can also be reduced when mercury can be removed satisfactorily simply by adding persulfate.

Alternatively, it may be so arranged that iodine or an iodine compound is added to absorption liquid in advance and an operation of adding persulfate to the absorption liquid is started only when the mercury concentration rises to or above a predetermined level but stopped when the mercury concentration falls to or below the predetermined level because iodine or an iodine compound is effective for removing mercury to a certain extent if it is added alone. Preferably, the concentration of iodine or the iodine compound in the absorption liquid is held to 0.5 to 8.0 mmol/L in terms of iodine or bromine atoms.

Preferably, an aeration treatment is conducted to the absorption liquid containing persulfate and iodine or bromine after bringing it into contact with exhaust gas. Preferably, the aeration treatment is conducted so as to adjust the ORP (at the silver-silver chloride electrode) of the absorption liquid to 200 to 800 mV and at the same time the pH of the absorption liquid to 4.0 to 5.5.

Additionally, the absorption liquid can circulate between the site where it contacts exhaust gas and the site where it is subjected to aeration treatment. For example, a gas dispersion (bubbling) type absorption tower having a continuous absorption liquid phase can be employed in the tower and exhaust gas can be introduced into an upper part of the continuous absorption liquid phase, while introducing air to a lower part of the continuous absorption liquid phase. With this arrangement, absorption liquid may be circulated by agitating it in the tower or by using a pump arranged outside the tower. The rate of introducing air and the rate of circulating liquid may be adjusted by monitoring the ORP of the liquid or the concentration of iodine or bromine contained in the exhaust gas that is being emitted. With such an arrangement, the possibility for iodine or bromine of being contained in the discharged exhaust gas can be further reduced after it is added.

The reason why the use of a gas bubbling type absorption tower having a continuous liquid phase is preferable will be described below. In a liquid dispersion type spray tower, exhaust gas is brought into contact with circulating liquid that is oxidized by air in a liquid pool and in which iodine (bromine) is freed immediately before it is emitted to the outside of the tower. Therefore, iodine (bromine) can coexist with gas being emitted with ease due to the iodine (bromine) distribution equilibrium between the circulating liquid and the exhaust gas that contact with each other. On the other hand, in a gas bubbling type absorption tower having a continuous liquid phase, liquid containing free iodine (bromine) is supplied from a lower part of the liquid phase to an upper part of the liquid phase so that mercury is effectively removed from the exhaust gas introduced to the upper part of the liquid phase. Nevertheless, the ORP of the absorption liquid in the upper part of the liquid phase is low because sulfur dioxide is being absorbed in the upper part of the liquid phase so that iodine in the liquid phase can hardly move into the gas phase. Iodine (bromine) is contained in the gas phase (bubbles) in the lower part of the liquid phase because air is introduced into the lower part of the liquid phase in order to produce free iodine. However, iodine (bromine) in the gas phase is absorbed into the liquid phase representing a low ORP while it moves up in the liquid phase and passes through the upper part of the liquid phase so that the exhaust gas discharged to the outside of the tower does not contain any iodine (bromine).

(2) Second Mode

In the second mode of the present invention, there is provided an exhaust gas treating method characterized by adding iodine gas to exhaust gas containing at least sulfur dioxide and mercury and subsequently bringing the mixture gas into contact with the absorption liquid in a wet type flue gas desulfurization unit in order to solve the above problems.

The inventors of the present invention found that the mercury concentration in the outlet gas of a downstream wet type flue gas desulfurization unit falls by adding iodine gas to exhaust gas prior to a desulfurization process. The inventors believe that the mercury removal rate of a wet type flue gas desulfurization unit is improved as a result of that metal mercury is oxidized by iodine to become mercury iodide (in other words $Hg^{(0)}$ is oxidized to become $Hg^{2+}$) so that the mercury removal rate in a wet type flue gas desulfurization unit is improved. While the improvement in the mercury removal rate achieved by adding persulfate into the absorption liquid in a wet type flue gas desulfurization unit is utilized in the first mode of the present invention, it is also a preferable mode of carrying out the present invention to add iodine, bromine or a compound of either of them to the absorption liquid. While the phenomenon that $Hg^{(0)}$ is oxidized to become $Hg^{2+}$ is also exploited and persulfate is added to absorption liquid (preferably along with iodine or bromine) in the first mode of carrying out the present invention, iodine gas is directly added to hot exhaust gas before the exhaust gas is brought into contact with absorption liquid in the second mode of carrying out the present invention. While absorption liquid can be also added, to which an oxidizing agent such as persulfate is added, to exhaust gas in the second mode of carrying out the invention, then the oxidizing agent is not added to the absorption liquid in the wet type flue gas desulfurization unit but to the absorption liquid drawn out from the wet type flue gas desulfurization unit so as to be added to exhaust gas subsequently. In other words, adding an oxidizing agent is not indispensable in the second mode of carrying out the present invention.

Since iodine belongs to the halogen group, adding bromine, chlorine or fluorine that belongs to the halogen group may conceivably be also effective. However, no improvement in the mercury removal rate is achieved in a simulation of adding bromine, chlorine or fluorine to exhaust gas conducted by the inventors of the present invention. The inventors of the present invention believes that the reason for this may be bromine, chlorine or fluorine reacts with sulfur dioxide quickly and becomes consumed in hot exhaust gas in the presence of some moisture and hence does not contribute to oxidation of mercury. On the other hand, iodine hardly reacts with sulfur dioxide in exhaust gas and the added iodine seems to simply contribute to oxidation of mercury. Iodine is preferably added to exhaust gas to a concentration (in exhaust gas) of 100 to 10,000 times of the mercury concentration in exhaust gas on a mol basis. The effect of raising the mercury removal rate is small when the concentration is 100 times or less, whereas the mercury removal rate is not raised further if iodine is added beyond the concentration of 10,000 times.

When adding iodine gas to exhaust gas, iodine powder may be heated to produce iodine gas, which may then be added into exhaust gas, or iodine powder may be directly sprayed into exhaust gas. While iodine is solid at room temperature, it is volatile and represents a high vapor pressure so that, when iodine is added as solid powder, it easily sublimates to become iodine gas in hot exhaust gas. When a gas cooling/dust removing tower is arranged upstream (at the gas inlet side) relative to the absorption tower of a wet type flue gas desulfurization unit, iodine may be added either at the inlet side or at the outlet side of the gas cooling/dust removing tower. When iodine gas is added to the inlet side of the gas cooling/dust removing tower, mercury is oxidized as a result and the oxidized mercury is partly absorbed in the gas cooling/dust removing tower. Alternatively, liquid containing an iodine compound that gives off iodine gas may be sprayed into exhaust gas. Liquid containing an iodine compound that gives off iodine gas may be aqueous solution in which iodine or an iodide is dissolved to a high concentration. While such aqueous solution may be prepared separately, the absorption liquid in the downstream wet type flue gas desulfurization unit may advantageously be partly drawn out and circulated for use. The iodine added to exhaust gas may partly be consumed to oxidize mercury and produce an iodide and partly remain as iodine in exhaust gas, although all the iodine is absorbed in the absorption liquid in the downstream wet type flue gas desulfurization unit along with sulfur dioxide. Therefore, iodine and/or iodide ions are concentrated in the absorption liquid to a high-concentration level so that the absorption liquid may partly well be sprayed into exhaust gas as "liquid containing an iodine compound that gives off iodine gas". If such is the case, the absorption liquid preferably contains iodine or an iodine compound at a concentration of 0.5 to 8.0 mmol/L in terms of iodine atoms to provide a certain effect in removing mercury in the absorption liquid as described above for the first mode of carrying out the present invention.

When circulating part of the absorption liquid for use, iodide ions in the absorption liquid are preferably oxidized into iodine from the viewpoint of efficiently generating iodine gas. For this reason, an oxidizing agent is preferably added to the absorption liquid before partly spraying the absorption liquid into exhaust gas. The oxidizing agent to be added to the absorption liquid may be selected from hydrogen peroxide, persulfates (such as sodium persulfate), oxoacids of iodine (such as sodium iodate and sodium periodate) and oxoacids of chlorine (such as sodium salt of hypochlorous acid, that of chlorous acid and that of chloric acid). The use of persulfate as oxidizing agent is preferable because $Hg^{(0)}$ contained in exhaust gas can be highly efficiently removed by way of gas/liquid contact with absorption liquid in the wet type flue gas desulfurization unit if compared with an instance of using only iodine as additive. If persulfate is employed, it is contained in the absorption liquid to a concentration of 500 to 5,000 mg/L as described above for the first mode of carrying out the present invention. Alternatively, the absorption liquid may be subjected to aeration treatment using oxygen-containing gas (e.g., air) to raise the ORP instead of adding an oxidizing agent. The operation of adding an oxidizing agent or exposing the absorption liquid to oxygen-containing gas may be conducted to the absorption liquid drawn out from the absorption tower or directly to the absorption liquid in the absorption tower. When the absorption liquid drawn out from the absorption tower is subjected to aeration treatment, the outlet gas of the operation may be introduced into exhaust gas with liquid.

The desulfurization process in a wet type flue gas desulfurization unit will be schematically described below. Firstly, sulfur dioxide contained in exhaust gas is absorbed into the absorption liquid and, while the absorbed sulfur dioxide initially exists in the absorption liquid in the form of sulfite ions (or bisulfite ions), those sulfite ions are subsequently oxidized into sulfate ions as the absorption liquid is subjected to aeration treatment using oxygen-containing gas, which sulfate ions then react with calcium ions in the absorption liquid to deposit as crystal of calcium sulfate. In actual apparatus, however, the sulfur dioxide absorption region and the sulfite ion oxidization region are not clearly divided and the entire absorption liquid in the apparatus can be approximated by a so-called complete mixing model in many cases. In view of such cases, it may be safe to say that an oxidation region in which sulfite ions can be oxidized into sulfate ions exists at least in part of the absorption liquid. Therefore, the absorption liquid can be partly drawn out from the oxidation region so as to be directly circulated and used as liquid to be introduced into exhaust gas. However, since the ORP for oxidizing iodide ions into molecular iodine is higher than the ORP for oxidizing sulfite ions into sulfate ions, the ORP of the absorption liquid drawn out from the oxidation region may not necessarily be high enough for oxidizing iodide ions into molecular iodine if it is high enough for oxidizing sulfite ions into sulfate ions. For this reason, preferably an oxidizing agent is added separately or the absorption liquid is subjected to aeration treatment additionally in order to satisfactorily oxidize iodide ions in the liquid into molecular iodine.

Preferably, acid is added to the liquid (aqueous solution, preferably absorption liquid) to be introduced into exhaust gas in order to effectively produce iodine gas from the aqueous solution containing iodine when it is introduced into exhaust gas. Like other halogen elements, molecular iodine dissolves more easily into alkaline aqueous solution than into acidic aqueous solution so that iodine gas is easily produced when acid is added to lower the pH of the liquid. Normally, the pH of absorption liquid is about 4.5 to 5.5 but iodine gas can be produced easily when the pH is lowered to about 2 to 3.5. While there are no limitations to the acid to be added, sulfuric acid or hydrochloric acid is generally employed from the viewpoint of cost and handling. Iodine gas will be easily produced when the temperature of the iodine-containing liquid to be introduced into exhaust gas is raised. Temperature is preferably between 30 and 100° C., more preferably between 45 and 100° C. because the temperature of the absorption liquid is raised to 40 to 50° C. in coal combustion exhaust gas. When the liquid is sprayed into hot exhaust gas, it is inevitably heated to accelerate the production of iodine gas. However, the timing of producing iodine gas can be made earlier to raise the mercury removing efficiency by preliminarily heating the liquid before spraying it.

Iodine can be contained in the outlet gas of the wet type flue gas desulfurization unit when iodine is accumulated excessively in the absorption liquid of the flue gas desulfurizer. Note, however, that the iodine concentration of the outlet gas depends not only on the iodine concentration in the absorption liquid but also on the sulfur dioxide concentration of the inlet gas. This is because the reduction/absorption of the iodine gas added to exhaust gas is suppressed when the sulfur dioxide concentration in the inlet gas falls. In other words, the iodine concentration in the outlet gas is influenced by various factors including the sulfur dioxide concentration in exhaust gas, the iodine gas concentration of the iodine added into exhaust gas, the iodine concentration in the absorption liquid and the ORP of the absorption liquid. Therefore, the rate at which iodine is added to the absorption liquid is preferably adjusted according to the sulfur dioxide concentration in exhaust gas in order to prevent iodine from being emitted into the outlet gas.

The gas/liquid contact methods that can be used in wet type flue gas desulfurization units include a method of dispersing liquid droplets in the gas phase (the use of a spray tower), a method of dispersing bubbles in the liquid phase (the use of a bubble column) and the use of the latter method is preferable to the use of the former method because the latter method provides a high absorption efficiency for the ingredients in the gas phase. When the present invention is carried out on a practically feasible scale, a facility in which a gas/liquid contact section 4 and an absorption liquid oxidation section 6 are formed vertically separately in a same vessel such as a Jet Bubbling Reactor (JBR) described in Japanese Patent Application Laid-Open No. 2001-162135 may preferably be employed. A JBR is a facility designed to use the latter method, in which absorption liquid circulates in the inside of a same vessel and exhaust gas that contains sulfur dioxide in the absorption liquid and takes the form of micro bubbles is introduced at a site located relatively close to the liquid surface and air to be used for oxidation is introduced into the absorption liquid at a site near the bottom of the vessel. In other words, in the case of a JBR, a gas/liquid contact section is formed in an upper region of the vessel, while an absorption liquid oxidation section is formed in lower region of the vessel. Thus, a JBR has an advantage that iodine is absorbed into the liquid phase again if emitted to gas phase while bubbles pass through the gas/liquid contact section and discharged into the upper space from the liquid surface so that the gas being discharged from the vessel does not practically contain any iodine even when iodide ions are oxidized by the absorption liquid oxidation section to become molecular iodine, which is then emitted to the gas phase.

While no iodine release limiting value is defined by regulations for drain water from wet type flue gas desulfurization units, an iodine removing step is preferably provided in order to prevent secondary environmental pollution. Then, iodine can be adsorbed and removed by means of an adsorbent such as active carbon and subsequently the adsorbent is regenerated to collect iodine.

As described above, in both the first mode of carrying out the present invention and the second mode of carrying out the present invention, mercury contained in exhaust gas, $Hg^{(0)}$ in particular, can be stably and efficiently removed with sulfur dioxide for a long period of time in wet type flue gas desulfurization units.

BEST MODE FOR CARRYING OUT THE INVENTION (1) Examples in the First Mode

Figure 1:
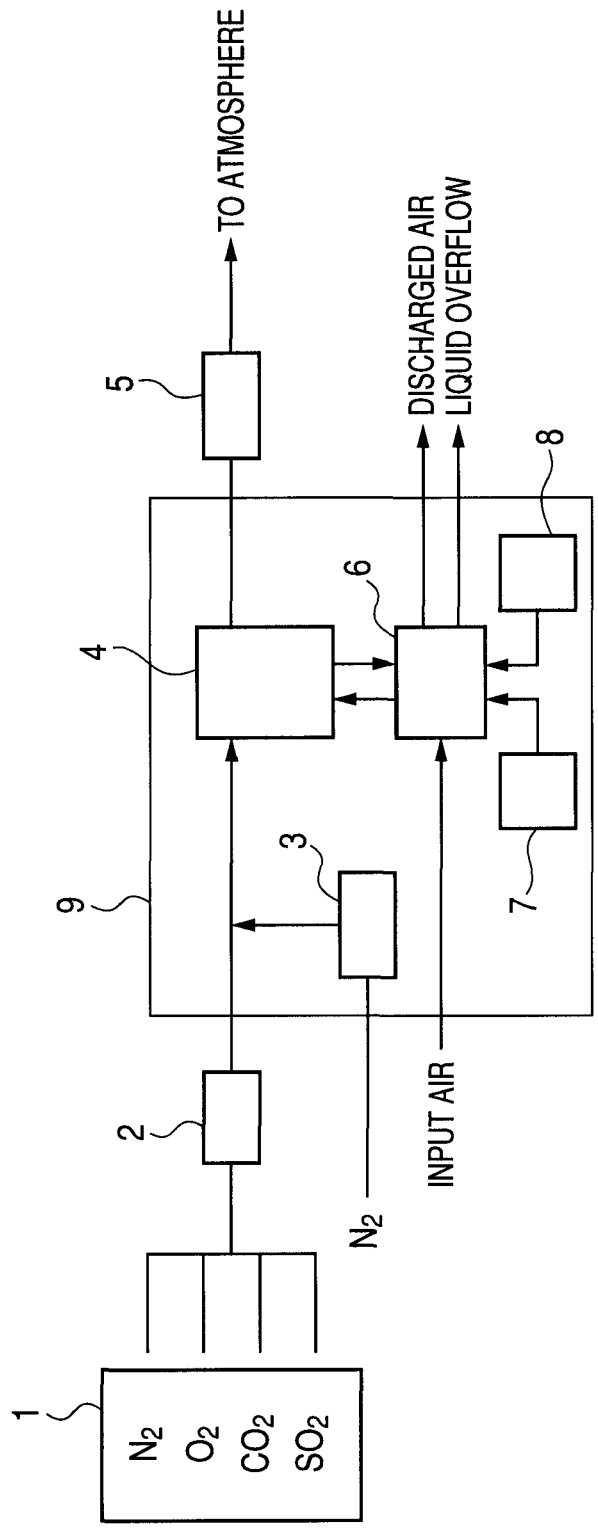
FIG. 1 is a schematic block diagram of an apparatus for carrying out the present invention in the first mode, illustrating the configuration thereof.

A labo test unit having a configuration as illustrated in FIG. 1 can typically be used for the first mode of carrying out the invention. Referring to FIG. 1, mixture gas containing nitrogen, oxygen, carbon dioxide and sulfur dioxide is supplied from the gas supply section 1 and warmed and humidified by hot water in the gas warming/humidifying section 2. Subsequently, mercury vapor generated by bubbling nitrogen gas in mercury at the mercury generating section 3 is added to the warmed and humidified mixture gas to produce simulated exhaust gas. The produced simulated exhaust gas is brought into contact with absorption liquid in the gas/liquid contact section 4, when sulfur dioxide and mercury vapor are absorbed, oxidized and removed from the simulated exhaust gas. Note that an abatement system 5 is installed in the case of the labo test unit illustrated in FIG. 1 because exhaust gas may contain mercury and halogen gas depending on the experiment conditions.

The absorption liquid that is brought into contact with the simulated exhaust gas in the gas/liquid contact section 4 circulates between the gas/liquid contact section 4 and the absorption liquid oxidizing section 6 and its ORP is adjusted in the absorption liquid oxidizing section 6 by exposure to air and its pH is adjusted by acid or alkali that is added from the pH adjusting liquid supply section 7. Additionally, various reagents including sodium persulfate and potassium iodide are added to the absorption liquid by the mercury oxidization/elimination agent supply section 8. Note that the mercury generating section 3, the gas/liquid contact section 4, the absorption liquid oxidizing section 6, the pH adjusting liquid supply section 7 and the mercury oxidization/elimination agent supply section 8 are contained in the air thermostatic chamber 9.

The gas/liquid contact system in the gas/liquid contact section 4 is preferably a system for dispersing bubbles in a liquid phase (such as a bubble column) rather than a system for dispersing liquid droplets in a gas phase (such as a spray tower) for the above-described reason and for the fact that the former system represents a higher efficiency for absorbing ingredients in the gas phase. When the present invention is carried out on a practically feasible scale, an arrangement for forming both the gas/liquid contact section 4 and the absorption liquid oxidizing section 6 in a same vessel such as a JBR described in Japanese Patent Application Laid-Open No. 2001-162135 may preferably be employed. In a JBR, absorption liquid circulates in a same vessel and sulfur dioxide containing exhaust gas in the form of micro bubbles is introduced into the absorption liquid at a site relatively close to the liquid surface and oxidizing air is introduced into the absorption liquid at a site close to the bottom of the vessel. In other words, with a JBR, a gas/liquid contact section is formed in an upper region of the vessel, while an absorption liquid oxidizing section is formed in a lower region of the vessel. Thus, free iodine that is emitted into the gas phase from the absorption liquid oxidizing section is absorbed once gain into the liquid phase while bubbles pass through the gas/liquid contact section and emitted into an upper space from the liquid surface so that the gas discharged from the vessel has an advantageous feature that it does not practically contain any free iodine.

Example 1

An experiment of removing sulfur dioxide and mercury from simulated exhaust gas was conducted by using the labo test unit of FIG. 1. Mixture gas containing $SO_2$ to a concentration of 1,000 ppm, $O_2$ to a concentration of 5 vol %, $CO_2$ to a concentration of 10 vol % and $N_2$ taking the balance was supplied from the gas supply section 1 at a rate of 100 NL/hour and warmed and humidified to sufficiently contain moisture at 50° C. in the gas warming/humidifying section 2. Then, $N_2$ was introduced into the mercury generating section 3 at a rate of 0.2 NL/hour to generate mercury vapor, which mercury vapor was added to the humidified mixture gas to produce simulated exhaust gas containing $Hg^{(0)}$ to a concentration of about 30 ppb. The produced simulated exhaust gas was then brought into contact with absorption liquid in the gas/liquid contact section 4 and the simulated exhaust gas was sampled both before and after the gas/liquid contact section 4 to observe the mercury concentration in the simulated exhaust gas.

The amount of absorption liquid in the gas/liquid contact section 4 and that of absorption liquid in the absorption liquid oxidizing section 6 were made respectively equal to 200 mL and 1,000 mL and the absorption liquid was driven to circulate so as to make its residence time in the absorption liquid oxidizing section equal to about 1 hour. Different absorption liquids were prepared by adding sodium persulfate ($Na_2S_2O_8$) and a halogen compound (selected from KI, KBr, KCl, $MgI_2$ and CuI) to a varying concentration (or without adding the latter). The concentrations of these agents in the liquid were observed from time to time and the agents were added to make them maintain predetermined respective concentration levels. The temperature in the air thermostatic chamber 9 was held to 50° C. While the pH of the absorption liquid in the gas/liquid contact section was adjusted to 5.0, the ORP was not adjusted after exposing the absorption liquid to air.

Figure 2:
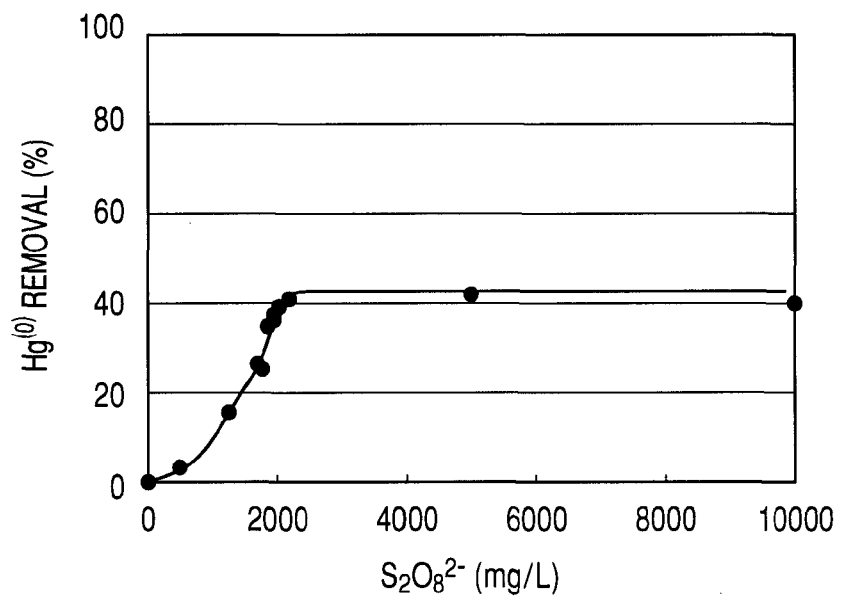
FIG. 2 is a graph illustrating the relationship between the concentration of persulfate in absorption liquid and the mercury removal rate.

FIG. 2 illustrates the relationship between the concentration of persulfate ions in the absorption liquid and the mercury removal rate when no halogen compound was added. From FIG. 2, it will be seen that the effect of removing mercury started to appear already when the concentration of persulfate ions was 500 mg/L and the mercury removal rate rose from 0% to about 40% as the concentration of persulfate ions increased until it got to 2,000 mg/L but became to be held subsequently to a constant level once the concentration of persulfate ions exceeded 2,000 mg/L. It was found that, when the concentration of persulfate ions went above 5,000 mg/L, oxygen was dissolved into the absorption liquid only slowly so that it was necessary to increase the amount of air introduced into the absorption liquid.

Figure 3:
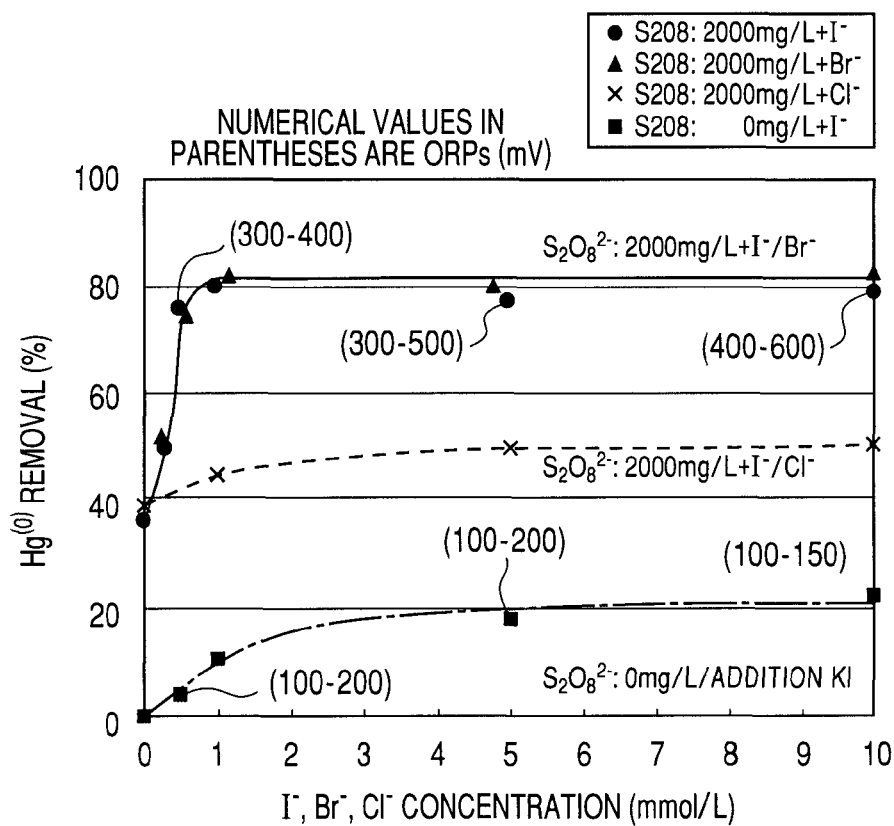
FIG. 3 is a graph illustrating the relationship between the concentration of iodide, bromide and chloride ions that coexist and the mercury removal rate.

On the other hand, FIG. 3 illustrates the influence of the concentration of iodide ions, that of bromide ions and that of chloride ions that coexisted and also the influence of the different ion types on the mercury removal rate when the concentration of persulfate ions was made equal to 2,000 mg/L. FIG. 3 also illustrates the influence of the concentration of iodide ions when the concentration of persulfate ions was 0 mg/L. From FIG. 3, it will be seen that iodide ions and bromide ions represent a remarkable effect of raising the mercury removal rate if compared with chloride ions. It will also be seen that iodide ions have the effect of removing mercury even if the concentration of persulfate ions is 0 mg/L.

The numerals illustrated in parentheses in FIG. 3 are the ORP values when iodide ions were added to concentrations of 0.5 mmol/L, 5 mmol/L and 10 mmol/L and the concentration of persulfate ions was 2,000 mg/L and 0 mg/L. As seen from FIG. 3, the ORP rose as the concentration of added iodide ions increased when the concentration of persulfate ions was 2,000 mg/L, although the ORP did not rise if the concentration of added iodide ions increased and even fell slightly when the concentration of added iodide ions and that of persulfate ions were 10 mmol/L and 0 mg/L respectively.

Example 2

An experiment of removing sulfur dioxide and mercury from simulated exhaust gas was conducted by using the labo test unit of FIG. 1. Mixture gas containing $SO_2$ to a concentration of 1,000 ppm, $O_2$ to a concentration of 5 vol %, $CO_2$ to a concentration of 10 vol % and $N_2$ taking the balance was supplied from the gas supply section 1 at a rate of 100

NL/hour and humidified to sufficiently contain moisture at 50° C. in the gas warming/humidifying section 2. Then, $N_2$ was introduced into the mercury generating section 3 at a rate of 0.2 NL/hour to generate mercury vapor, which mercury vapor was added to the humidified mixture gas to produce simulated exhaust gas containing $Hg^{(0)}$ to a concentration of about 30 ppb. The produced simulated exhaust gas was then brought into contact with absorption liquid in the gas/liquid contact section 4 and the simulated exhaust gas was sampled both before and after the gas/liquid contact section 4 to observe the mercury concentration and the concentration of sulfur dioxide in the simulated exhaust gas.

The amount of absorption liquid in the gas/liquid contact section 4 and that of absorption liquid in the absorption liquid oxidizing section 6 were made respectively equal to 200 mL and 1,000 mL and the absorption liquid was driven to circulate so as to make its residence time in the absorption liquid oxidizing section equal to about 1 hour. The absorption liquid was prepared by adding $Na_2S_2O_8$ at a rate of 2,000 mg/L (as $S_2O_8^{2-}$) into the ion-exchanged water. The temperature in the air thermostatic chamber 9 was held to 50° C. The pH of the absorption liquid was adjusted to 5.0 while the ORP was adjusted by way of exposure to air or oxygen. The amount of air (oxygen) used for exposure was made to vary within a range between 10 to 500 times of the theoretical oxygen demand relative to the amount of oxidative absorption. As the amount of air (oxygen) used for exposure is raised, the ORP rose to get to 600 to 800 mV and then constantly remained substantially at that level.

Figure 4:
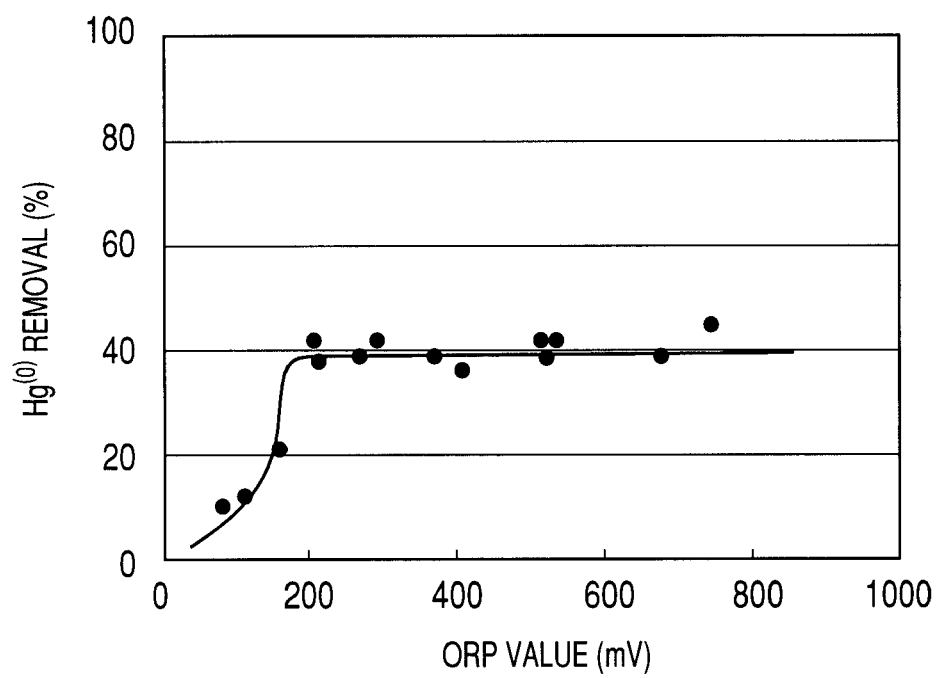
FIG. 4 is a graph illustrating the relationship between the ORP of absorption liquid and the mercury removal rate.

FIG. 4 illustrates the relationship between the ORP of the absorption liquid and the mercury removal rate. From FIG. 4, it will be seen that the mercury removal rate clearly rose when the ORP was not lower than 150 mV, preferably not lower than 200 mV. On the other hand, not only the mercury removal rate clearly fell but also the desulfurization rate also fell when the ORP was less than 150 mV. More specifically, the dusulfurization rate was about 93% when the ORP was not less than 300 mV but was about 78% when the ORP was less than 150 mV.

The ORP was made less than 150 mV in this example under the condition where the quantity of introduced air was considerably made small. More specifically, a high ORP was obtained under the condition where the quantity of introduced air was considerably small if compared with a system where absorption liquid that did not contain persulfate ions is employed. The ORP varied but the mercury removal rate practically did not change when the pH of the absorption liquid was made to vary within a range between 4.0 and 5.5. On the other hand, the desulfurization rate fell to 85% when the pH of the absorption liquid was not higher than 4.0 but remained unchanged and stable when the pH was not lower than 5.0.

Example 3

The experiment of this example was conducted under conditions same as those of Example 2 except that $HgCl_2$ was added to exhaust gas to a concentration of 30 ppb and KI was added to the absorption liquid to a concentration of 2 mmol/L. However, a value of air 15 L/hour was selected for the aeration rate and the ORP was 400 to 600 mV under that condition.

Apart from this example, an experiment was conducted in a comparative example under the same conditions as those of this example except that absorption liquid that contained neither $Na_2S_2O_8$ nor KI was employed and a value of air 40 L/hour was selected for the aeration rate. The observed desulfurization rate was not less than 90% but practically no $Hg^{(0)}$ could be removed.

Thus, it was found that the arrangement of this example could maintain a desulfurization rate of not less than 90%, an $Hg^{(0)}$ removal rate of not less than 75% and an $HgCl_2$ removal rate of not less than 90% over 100 hours with an amount of air used for exposure that was smaller than the amount of air used in the comparative example.

Freed iodine was observed in the gas/liquid contact section 2 and iodine was detected to a concentration of 8 ppm in the exhaust gas from the gas/liquid contact section 2 immediately after the start of the experiment of this example. However, no freed iodine was observed in the gas/liquid contact section and the $Hg^{(0)}$ removal rate was stabilized when the rate at which absorption liquid was driven to circulate between the gas/liquid contact section and the absorption liquid oxidizing section 6 was raised by 30%. Additionally, no reemission of $Hg^{(0)}$ from the absorption liquid was found.

(2) Examples in the Second Mode

Figure 5:
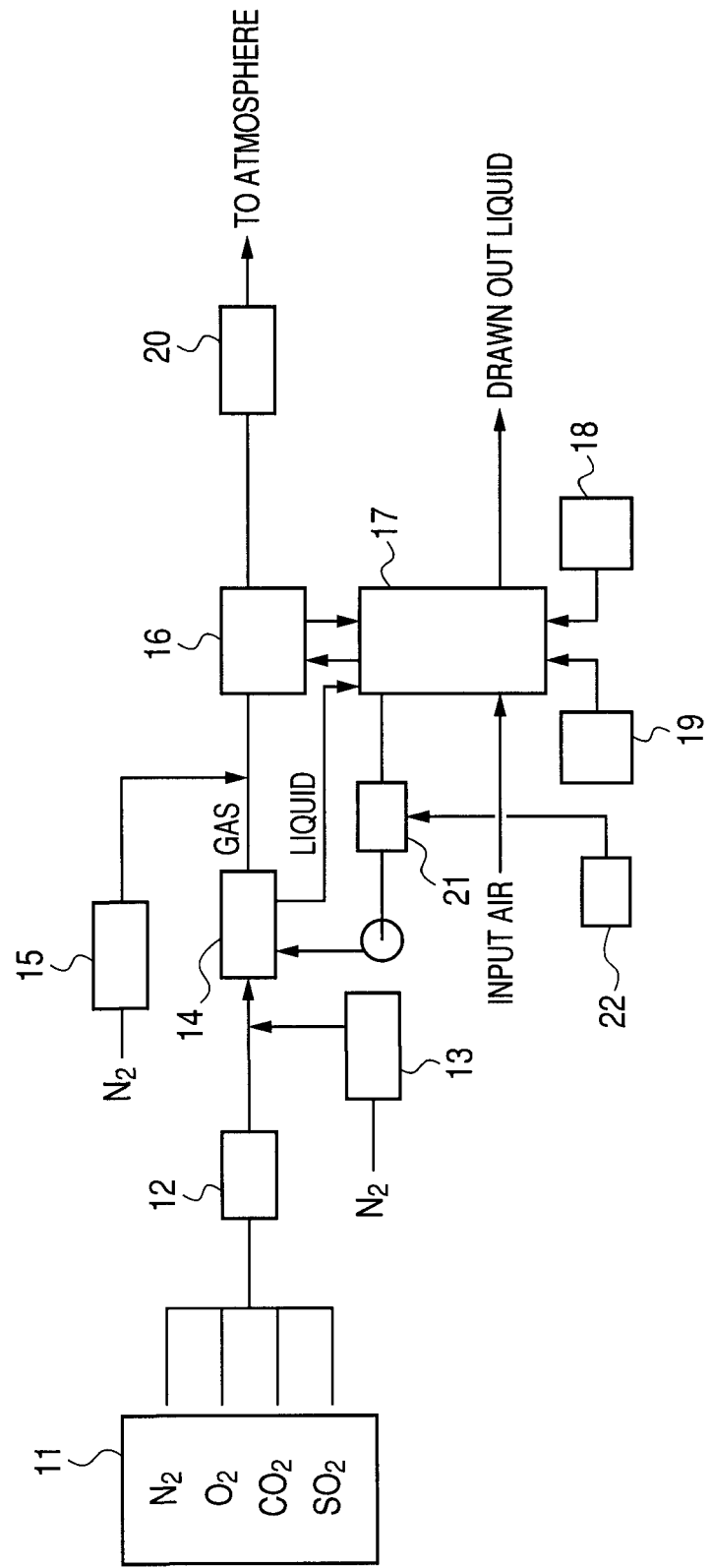
FIG. 5 is a schematic block diagram of an apparatus for carrying out the present invention in the second mode, illustrating the configuration thereof.

A labo test unit having a configuration as illustrated in FIG. 5 can typically be used for the second mode of the invention. Referring to FIG. 5, mixture gas containing nitrogen, oxygen, carbon dioxide and sulfur dioxide is supplied from the gas supply section 11 and warmed and humidified by hot water or a heater in the gas warming/humidifying section 12. Subsequently, mercury vapor generated by bubbling nitrogen gas in mercury at the mercury generating section 13 is added to the warmed and humidified mixture gas to produce simulated exhaust gas. The produced simulated exhaust gas is firstly driven to pass through the first gas/liquid contact section 14, where liquid for generating iodine gas is sprayed into the simulated exhaust gas to add iodine gas to the simulated exhaust gas. The absorption liquid in the second gas/liquid contact section, which will be described hereinafter, may partly be used as liquid for generating iodine gas to be added. Alternatively, iodine gas may be directly added to the simulated exhaust gas from the additive gas generating section 15. The additive gas generating section 15 is designed to heat iodine powder in order to sublimate it and generate iodine gas. The labo test unit illustrated in FIG. 5 is designed so as to allow the simulated exhaust gas to bypass the first gas/liquid contact section 14 for the purpose of comparison.

The simulated exhaust gas to which iodine gas is added is then driven to pass through the second gas/liquid contact section 16, where sulfur dioxide and mercury are removed as it is brought into contact with the absorption liquid. The second gas/liquid contact section 16 is a bubble column type gas/liquid contact system and the absorption liquid is driven to circulate between the second gas/liquid contact section 16 and the absorption liquid oxidizing section 17. The absorption liquid is subjected to aeration treatment in the absorption liquid oxidizing section 17 so that sulfite ions in the absorption liquid are oxidized to become sulfate ions. Additionally, an iodine compound such as potassium iodide may be added to the absorption liquid from the first agent supply section 18. Furthermore, an alkali agent may be injected from the pH adjusting alkali supply section 19 to adjust the pH of the absorption liquid (preferably to 4.5 to 5.5). The outlet gas from the second gas/liquid contact section 18 is driven to pass through an abatement system 20 and consequently the mercury and the iodine remaining in the gas are removed.

When spraying absorption liquid containing iodine is sprayed in the first gas/liquid contact section 14, an iodine compound is added in the absorption liquid oxidizing section 17 from the first agent supply section 18 and the absorption liquid drawn out from the absorption liquid oxidizing section 17 is pumped and introduced into the first gas/liquid contact section 14 by way of the liquid residence vessel 21. Aqueous solution of sodium persulfate can be introduced into the liquid residence vessel 21 from the second agent supply section 22. Additionally, the pH of the absorption liquid containing iodine that is to be sprayed into the simulated exhaust gas can be reduced (preferably to 2.0 to 3.5) by adding hydrochloric acid to the liquid residence vessel 21 from the second agent supply section 22. When, on the other hand, iodine gas is directly added into the simulated exhaust gas, iodine powder is filled into the additive gas generating section 15 and heated (preferably to about 50° C.) nitrogen gas is driven to pass through it so as to generate iodine gas, whose concentration is adjusted by nitrogen gas and which is then supplied into the exhaust gas. Note that the entire labo test unit is contained in an air thermostatic chamber and held to a constant temperature (of preferably about 45° C.).

In each of the examples and the comparative example that will be described hereinafter, simulated exhaust gas containing sulfur dioxide ($SO_2$) to a concentration of 600 ppm, oxygen ($O_2$) to a concentration of 5 vol %, carbon dioxide ($CO_2$) to a concentration of 10 vol % and $N_2$ taking the balance was made to flow into the labo test unit at a rate of 400 NL/hour and the mercury ($Hg^{(0)}$) concentration of the simulated exhaust gas was made equal to 50·g/Nm$^3$ by adjusting the rate of supply of nitrogen gas to the mercury generating section 13. Then, the mercury removal rate and the sulfur dioxide removal rate (desulfurization rate) were evaluated by observing the mercury concentration and the sulfur dioxide concentration in the outlet gas from the second gas/liquid contact section 16. Additionally, the absorption liquid oxidizing section 17 was loaded with simulated absorption liquid (prepared by dissolving calcium chloride ($CaCl_2$) into water to a Cl$^-$ concentration of 10,000 wt-ppm and gypsum was added by an amount equivalent to 5 wt % as $CaSO_4.2H_2O$). Then, the iodine concentration, the oxide concentration and the pH value were adjusted on the basis of the simulated absorption liquid. The temperature of the entire labo test unit was adjusted to as be maintained at 45° C.

Comparative Example

The simulated exhaust gas that was prepared in the above-described manner was driven to directly pass through the second gas/liquid contact section 16. In other words, the first gas/liquid contact section 14 was bypassed and no iodine gas was added from the additive gas generating section 15. The pH of the absorption liquid was adjusted to 4.5 by adding an alkali agent in the second gas/liquid contact section and both the temperature of the simulated exhaust gas and that of the absorption liquid were adjusted to 45° C. At this time, the mercury removal rate was not higher than 5% and the desulfurization rate was about 85%.

Example 5

Figure 6:
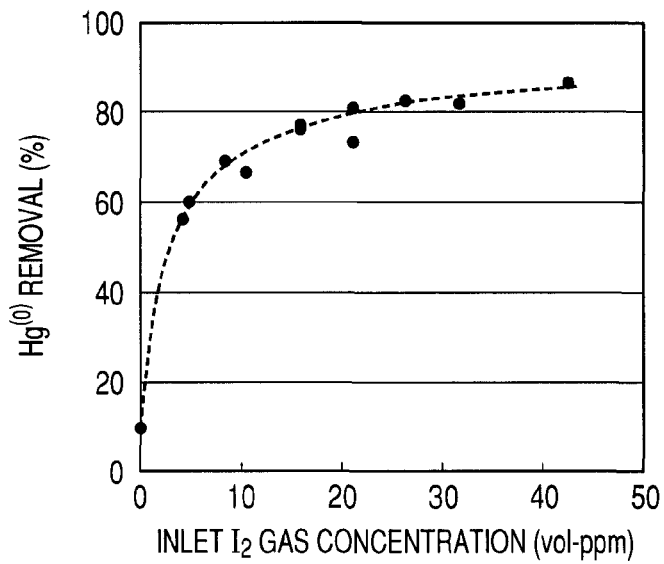
FIG. 6 is a graph illustrating the relationship between the concentration of added iodine gas and the mercury removal rate.

An experiment was conducted in the same manner as in Comparative Example except that iodine gas was introduced from the additive gas generating section 15. More specifically, iodine gas was added into the simulated exhaust gas to a concentration within a range between 0 and 40 vol-ppm (0 to 7,140 times of the mercury concentration on a mol basis). FIG. 6 illustrates the relationship between the iodine concentration and the mercury removal rate obtained in this example. As seen from FIG. 6, the mercury ($Hg^{(0)}$) removal rate dramatically rose from 10% to about 60% when iodine gas was added to a concentration of 5 vol-ppm (892 times of the mercury concentration on a mol basis) and still rose thereafter as the concentration of added iodine is increased if compared with an instance where no iodine gas was added. On the other hand, the desulfurization rate remained constantly at about 85% as in Comparative Example regardless of the iodine concentration. The iodine concentration in the outlet gas from the second gas/liquid contact section 16 was below the detection limit of the detection tube and that of the alkali absorption method.

Example 6

An experiment was conducted in the same manner as in Comparative Example except that the simulated exhaust gas was driven to pass through the first gas/liquid contact section 14 and liquid containing iodine was added to the simulated exhaust gas. More specifically, aqueous solution of potassium iodide (KI) was added to the absorption liquid oxidizing section 17 from the first agent supply section 18 so as to make the iodine concentration in the absorption liquid equal to 4 mmol/L (constantly). Additionally, aqueous solution of sodium persulfate was added to the liquid residence vessel 21 from the second agent adding section 22 so as to make the sodium persulfate ($Na_2S_2O_8$) concentration in the liquid to be sprayed to the simulated exhaust gas in the first gas/liquid contact section 14 equal to the defined value of 0 to 6 mmol/L. The addition rate of the liquid to be added to the first gas/liquid contact section 14 was made equivalent to 1.0 in terms of liquid/gas ratio (L/m$^3$).

Figure 7:
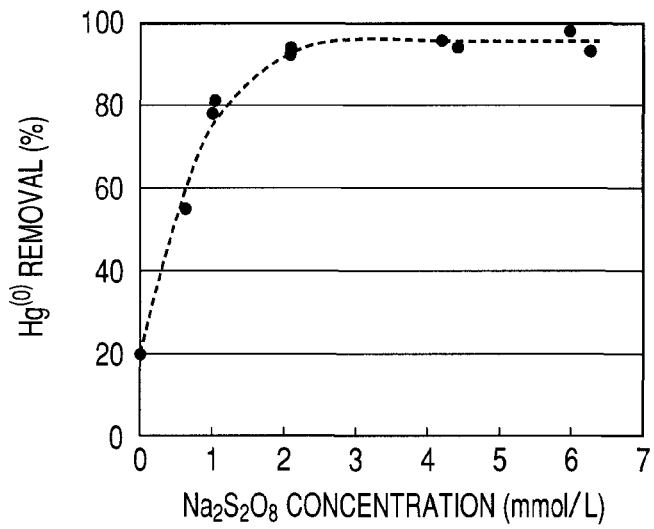
FIG. 7 is a graph illustrating the relationship between the concentration of added sodium persulfate and the mercury removal rate.

FIG. 7 illustrates the relationship between the sodium persulfate concentration and the mercury removal rate. As seen from FIG. 7, the mercury removal rate was improved in proportion to the concentration of added sodium persulfate until the concentration got to 2 mmol/L but remained flat at about 95% beyond the above concentration level. On the other hand, the desulfurization rate was about 90% even when the sodium persulfate concentration was zero to evidence an improvement relative to Example 5 (where iodine gas was directly added). Then, the desulfurization rate rose gradually up to about 95% with the increase of $Na_2S_2O_8$ concentration in the absorption liquid. Iodine was detected in the outlet gas from the second gas/liquid contact section only at a low concentration (not higher than 1 ppm) when the sodium persulfate concentration was 6 mmol/L but no iodine was detected when the sodium persulfate concentration was 0 to 5 mmol/L. Therefore, it seems that sodium persulfate is preferably added to a concentration of 1 to 5 mmol/L.

Figure 8:
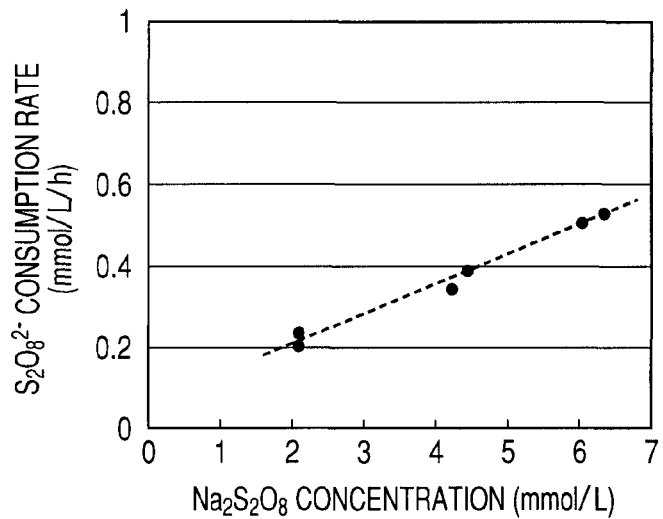
FIG. 8 is a graph illustrating the relationship between the concentration of sodium persulfate and the sodium persulfate consumption rate.

FIG. 8 illustrates the consumption rate, or the consumption per unit time, of $Na_2S_2O_8$ at concentrations of not less than 2 mmol/L when the mercury removal rate gets to a constant level. As seen from FIG. 8, the consumption rate of $Na_2S_2O_8$ increases with the increase of the concentration of $Na_2S_2O_8$ in the absorption liquid. Therefore, it is advantageous to keep the concentration of added sodium persulfate low when the mercury removal rate remains flat. In this example, 2 mmol/L is an optimum concentration of $Na_2S_2O_8$ in the absorption liquid.

Example 7

An experiment was conducted in the same manner as in Example 6 except that sodium persulfate was replaced by hydrogen peroxide ($H_2O_2$) or sodium hypochlorite (NaClO) as oxidizing agent and the concentration thereof was held to 2 mmol/L. Table 1 shows the obtained results. Note that Table 1 represents the mercury removal rate observed when sodium persulfate was used as reference (Example 6).

TABLE 1

| oxidizing agent type | $H_2O_2$ | NaClO | $Na_2S_2O_8$ |
|---|---|---|---|
| mercury removal rate (%) | 85 | 95 | 92 |

As seen from Table 1, while hydrogen peroxide exhibited a mercury removal rate slightly lower than sodium persulfate, sodium hypochlorite provided a result that is equivalent or higher than sodium persulfate. However, in actual plants where the temperature of exhaust gas is considerably high, it seems that hydrogen peroxide and sodium hypochlorite may be decomposed and/or consumed at a relatively high rate in the reaction with sulfur dioxide.

Example 8

An experiment was conducted in the same manner as in Example 6 except that hydrochloric acid was added in addition to sodium persulfate and the pH of the liquid to be added to the simulated exhaust gas was lowered to 2.5. However, the concentration of the sodium persulfate to be added was made equal to 1.0 mmol/L. As a result, the mercury removal rate was about 90%, which evidenced an improvement relative to Example 2 (about 80%) where sodium persulfate was added to the same concentration.

This patent application claims the benefit of priority of Japanese Patent Application No. 2007-056597, filed Mar. 7, 2007, and Japanese Patent Application No. 2007-303323, filed Nov. 22, 2007, the entire contents of which are incorporated herein by reference.

The invention claimed is:

1. An exhaust gas treating method of removing sulfur dioxide from combustion exhaust gas containing at least sulfur dioxide and mercury by bringing the exhaust gas into contact with absorption liquid,
wherein persulfate is added into the absorption liquid so as to make a concentration of persulfate equal to 500 to 2,000 mg/L;
wherein iodine, bromine or a compound of either of them is further added to the absorption liquid; and
wherein the absorption liquid is subjected to aeration treatment after it is brought into contact with the exhaust gas so that the absorption liquid exhibits an ORP of 200 to 800 mV an a pH value of 4.0 to 5.5,
whereby mercury is removed along with sulfur dioxide from the exhaust gas.

2. The exhaust gas treating method according to claim 1, wherein iodine, bromine or a compound of either of them is added so as to make a concentration thereof equal to 0.5 to 8.0 mmol/L in terms of iodine or bromine atoms.

3. The exhaust gas treating method according to claim 1, wherein a mercury concentration of the exhaust gas after the exhaust gas is brought into contact with the absorption liquid is continuously observed and an operation of adding iodine, bromine or a compound of either of them is started when the mercury concentration becomes not lower than a predetermined level but stopped or reduced when the mercury concentration falls to or below the predetermined level.

4. The exhaust gas treating method according to claim 1, wherein a concentration of iodine or an iodine compound of the absorption liquid is held to 0.5 to 8.0 mmol/L in terms of iodine atoms, while a mercury concentration of the exhaust gas after the exhaust gas is brought into contact with the absorption liquid is continuously observed and an operation of adding persulfate is stopped when the mercury concentration falls to or below the predetermined level.

5. The exhaust gas treating method according to claim 1, wherein the absorption liquid is driven to circulate between a site where it is brought into contact with the exhaust gas and a site of the aeration treatment.

6. The exhaust gas treating method according to claim 5, wherein a gas bubbling type absorption tower having a continuous phase of the absorption liquid in the tower is employed and the exhaust gas is introduced to an upper part of the continuous phase so as to be brought into contact with the absorption liquid while air is introduced to a lower part of the continuous phase in order to subject the absorption liquid to the aeration treatment and wherein the absorption liquid is agitated in the tower or circulated by way of a pump arranged outside the tower.

* * * * *